US012783450B2

(12) United States Patent
Kim

(10) Patent No.: US 12,783,450 B2
(45) Date of Patent: Nov. 3, 2026

(54) MIPI CIRCUIT, CHIP AND ELECTRONIC DEVICE

(71) Applicant: Beijing ESWIN Computing Technology Co., Ltd., Beijing (CN)

(72) Inventor: Jung-hyun Kim, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 18/948,799

(22) Filed: Nov. 15, 2024

(65) Prior Publication Data

US 2025/0335388 A1 Oct. 30, 2025

(30) Foreign Application Priority Data

Apr. 28, 2024 (CN) ........................ 202410528268.6

(51) Int. Cl.
*G06F 13/42* (2006.01)
*G06F 13/16* (2006.01)
*G06F 13/40* (2006.01)

(52) U.S. Cl.
CPC ...... *G06F 13/4282* (2013.01); *G06F 13/1668* (2013.01); *G06F 13/4068* (2013.01)

(58) Field of Classification Search
CPC ............ G06F 13/1668; G06F 13/4068; G06F 13/4282
See application file for complete search history.

(56) References Cited

U.S. PATENT DOCUMENTS

2019/0045090 A1* 2/2019 Chiueh .................... H04N 5/08
2021/0367317 A1* 11/2021 Suzuki ...................... H01P 5/18
2023/0058759 A1* 2/2023 Hori .................... H04L 25/0276
2025/0077462 A1* 3/2025 Devashya Shivarama .................. G06F 13/4282
2025/0355480 A1* 11/2025 Zhang .................. G06F 1/3212

OTHER PUBLICATIONS

C. Song et al., "A 24-GB/s MIPI C-/D-Phy Receiver Bridge Chip With Phase Error Calibration Supporting FPGA-Based Frame Grabber," in IEEE Transactions on Very Large Scale Integration (VLSI) Systems, vol. 32, No. 4, pp. 714-727, Apr. 2024, doi: 10.1109/TVLSI.2024.3364839 (Year: 2024).*
K. Lim, G. S. Kim, S. Kim and K. -H. Baek, "A multi-lane MIPI CSI receiver for mobile camera applications," in IEEE Transactions on Consumer Electronics, vol. 56, No. 3, pp. 1185-1190, Aug. 2010, doi: 10.1109/TCE.2010.5606244. (Year: 2010).*

* cited by examiner

*Primary Examiner* — Eric T Oberly
(74) *Attorney, Agent, or Firm* — Baker Hostetler

(57) ABSTRACT

The disclosure provides a mobile industry processor interface (MIPI) circuit, a chip and an electronic device. The MIPI interface circuit includes N pins, a path control component, and N interface components. The mode of data transmission in the MIPI is controlled via the path control component, which improves the efficiency and flexibility of data transmission. Moreover, by multiplexing the interface components in the data paths of a display physical layer (DPHY) and a camera physical layer (CPHY), the complexity and cost of the MIPI interface circuit can be reduced, and the scope of application of the MIPI can be expanded.

16 Claims, 4 Drawing Sheets

MIPI CIRCUIT, CHIP AND ELECTRONIC DEVICE

CROSS REFERENCE TO RELATED APPLICATIONS

This application claims priority and benefits to Chinese Application No. 202410528268.6, filed on Apr. 28, 2024, the entire content of which is incorporated herein by reference.

TECHNICAL FIELD

The disclosure relates to a field of electronic technology, in particular to a mobile industry processor interface (MIPI) circuit, a chip and an electronic device.

BACKGROUND

In the mobile industry, the size and layout of internal components are becoming more and more stringent as the user's demand for device performance and functionality continues to increase. For a mobile industry processor interface (MIPI), as the key interface connecting the processor and peripheral devices, the reduction of its size and volume is crucial for the design and optimization of the entire device.

SUMMARY

The disclosure provides a mobile industry processor interface (MIPI) circuit, a chip and an electronic device. The specific schemes are provided as follows.

According to a first aspect of embodiments of the disclosure, a MIPI circuit is provided. The MIPI circuit includes:

N pins, a path control component and N interface components;

in which the path control component is configured to control connection states of the N pins with the N interface components according to an operating mode of the MIPI, the operating mode of the MIPI includes a camera physical layer (CPHY) mode and a display physical layer (DPHY) mode, and the MIPI includes $$\left\lfloor \frac{N}{3} \right\rfloor$$

CPHY lanes, and $$\left\lfloor \frac{N}{2} \right\rfloor - 1$$

DPHY data lanes and 1 DPHY clock (CLK) lane.

According to a second aspect of embodiments of the disclosure, a chip including the MIPI circuit, the MIPI circuit comprising: N pins, a path control component and N interface components;

wherein the path control component is configured to control connection states of the N pins with the N interface components according to an operating mode of the MIPI, the operating mode of the MIPI comprises a camera physical layer (CPHY) mode and a display physical layer (DPHY) mode, and the MIPI comprises $$\left\lfloor \frac{N}{3} \right\rfloor$$

CPHY lanes, and $$\left\lfloor \frac{N}{2} \right\rfloor - 1$$

DPHY data lanes and 1 DPHY clock (CLK) lane.

According to a third aspect of embodiments of the disclosure, an electronic device including the chip and a display is provided, wherein the chip comprises the MIPI circuit, the MIPI circuit comprising: N pins, a path control component and N interface components;

wherein the path control component is configured to control connection states of the N pins with the N interface components according to an operating mode of the MIPI, the operating mode of the MIPI comprises a camera physical layer (CPHY) mode and a display physical layer (DPHY) mode, and the MIPI comprises $$\left\lfloor \frac{N}{3} \right\rfloor$$

CPHY lanes, and $$\left\lfloor \frac{N}{2} \right\rfloor - 1$$

DPHY data lanes and 1 DPHY clock (CLK) lane.

Additional aspects and advantages of the disclosure will be given in part in the following descriptions, become apparent in part from the following descriptions, or be learned from the practice of the disclosure.

BRIEF DESCRIPTION OF THE DRAWINGS

Above and/or additional aspects and advantages of the disclosure will become apparent and more readily appreciated from the following descriptions made with reference to the accompanying drawings, in which:

FIG. 1(*b*) is a schematic diagram of lane structure of a camera physical layer (CPHY).

DETAILED DESCRIPTION

Embodiments disclosed in the disclosure are described in detail below, examples of which are shown in the accompanying drawings, in which the same or similar symbols throughout represent the same or similar elements or elements having the same or similar functions. The embodiments described below with reference to the accompanying drawings are exemplary and are intended to be used to explain the disclosure and are not to be construed as limiting the disclosure.

In the existing MIPI, in order to meet diversified data transmission requirements in different scenarios, the specifications of two physical layers, namely, a display physical layer (DPHY) and a camera physical layer (CPHY), are usually combined, so that the MIPI can fully utilize the advantages of the specifications of both physical layers to achieve more flexible, efficient and concurrent data transmission.

Figure 1A:
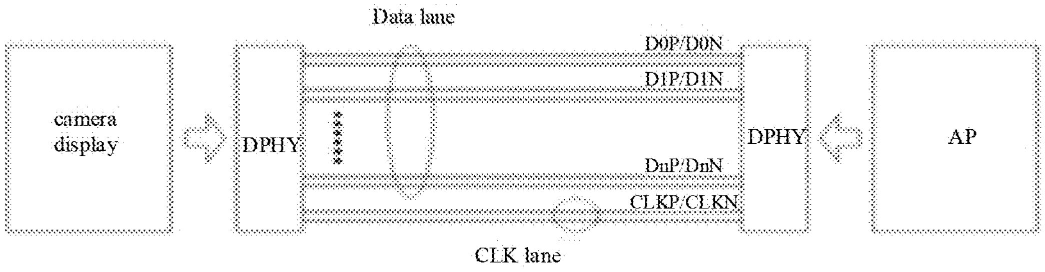
FIG. 1(*a*) is a schematic diagram of lane structure of a display physical layer (DPHY).
Figure 1B:
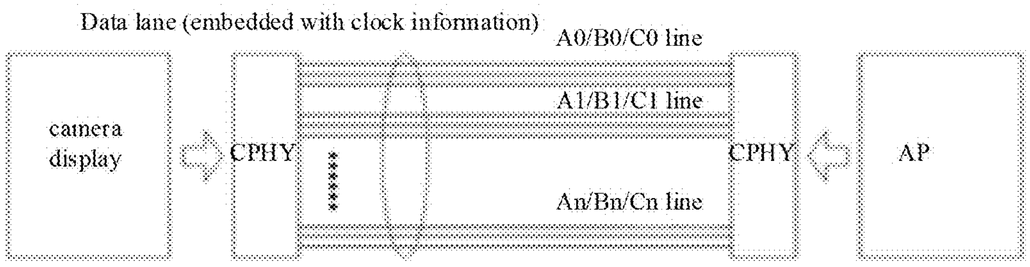

FIG. 1(*a*) is a schematic diagram of lane structure of a DPHY. FIG. 1(*b*) is a schematic diagram of lane structure of a CPHY.

DPHY is a source synchronization physical layer specification, which is an interface between a camera/display and an application processor (AP), where data is transmitted over differential lines, using a dedicated synchronization clock (CLK) lane to ensure stability and accuracy of data transmission. It is suitable for low-latency and low-power data transmission scenarios.

As illustrated in FIG. 1(*a*), the DPHY has (n+1) data lanes, denoted as D0, D1, . . . , Dn, and one CLK lane. Each data lane or CLK lane has two lines, which correspond to two pins, and the two pins of the lane are distinguished by P and N. The two pins corresponding to the data lane are DnP and DnN, and the two pins corresponding to the CLK lane are CLKP and CLKN.

The CPHY also serves as an interface between a camera/display and an AP. However, in the CPHY, since there is no separate lane for CLK information, the CLK information is embedded within the transmitted data information. Therefore, the CPHY can achieve higher bandwidth and transmission efficiency compared to the DPHY, and is suitable for high data volume and high resolution data transmission scenarios. As illustrated in FIG. 1(*b*), the CPHY has (n+1) data lanes, each lane has three pins (which are denoted by A, B, and C respectively), and each pin can transmit high, medium, and low signals.

It should be noted that the number of data lanes in DPHY and CPHY can be configured based on application requirements, etc. For example, the number of data lanes in DPHY may be 1, 2 or 4, and the number of data lanes in CPHY may be 1, 2 or 3, which is not limited in the disclosure.

Figure 2:
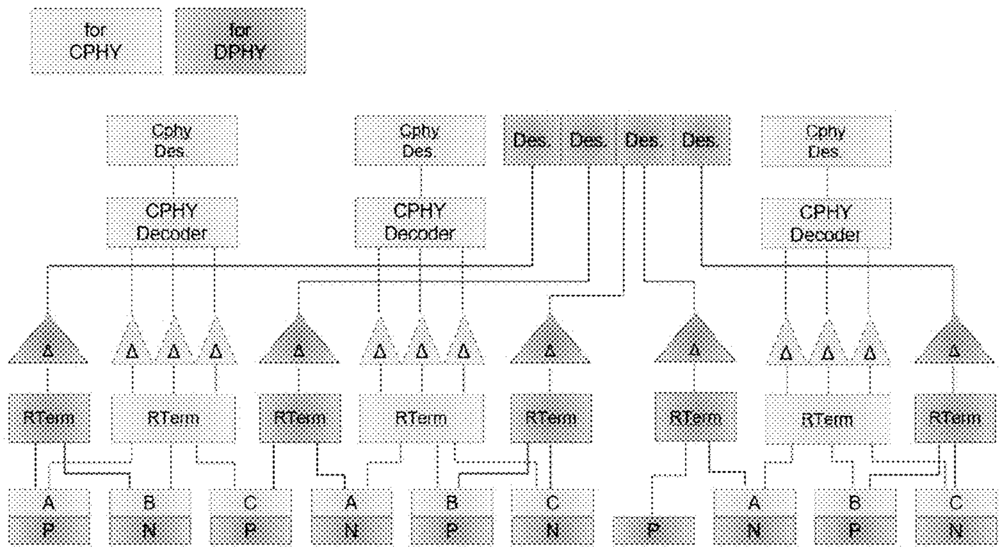
FIG. 2 is a schematic diagram of a MIPI circuit in the related art.

FIG. 2 is a schematic diagram of a MIPI circuit in the related art.

As illustrated in FIG. 2, the physical layers of the MIPI include a CPHY and a DPHY. The MIPI is capable of transmitting data in CPHY or DPHY mode, which can satisfy the data transmission requirements in different scenarios. The circuits of the MIPI shown in FIG. 2 may include: a Deserialize (Des.) component, a decoder, an interface component (represented as a triangle in FIG. 2), a resistor of termination (Rterm), and pins A\B\C\P\N.

The Des. component is used to convert serial data into parallel data, i.e., restores its original object or data structure to facilitate processing.

The decoder is used to separating the embedded CLK information from the data information in CPHY mode. Since the CLK information and the data information are entered separately in the DPHY mode, there is no decoder in DPHY path.

The interface component is used to receive and transmit data signals, which includes a low-power transceiver and a comparator. Each low-power transceiver may include: a Low-Power Receive (LPRX), a Low Power Contention Detector (LPCD), and a Low-Power Transmit (LPTX). The comparator is used for receiving and processing high-speed data, which can receive two or more input signals and output a binary signal based on the magnitude or logical relation of these input signals. In the embodiment of the disclosure, the comparator may be a High-Speed Receive (HSRX).

The Rterm is used for impedance matching of transmission lines, which can improve signal quality by eliminating signal reflection.

The pin is a connector for signal transmission. pins with different letters have the same functions. In FIG. 2, the letters A, B, C, P and N on each pin are only used to indicate whether the pin belongs to DPHY or CPHY.

As can be seen from FIG. 2, the MIPI can receive data via pins and then transmit it to the Rterm, the LPRX, the comparator, the decoder (there is no decoder in the data transmission path in the DPHY mode), and the Des. component for data processing in order from bottom to top according to the path shown in FIG. 2. It should be noted that the numbers of lanes in the DPHY and the CPHY in FIG. 2 are schematic only.

Figure 3:
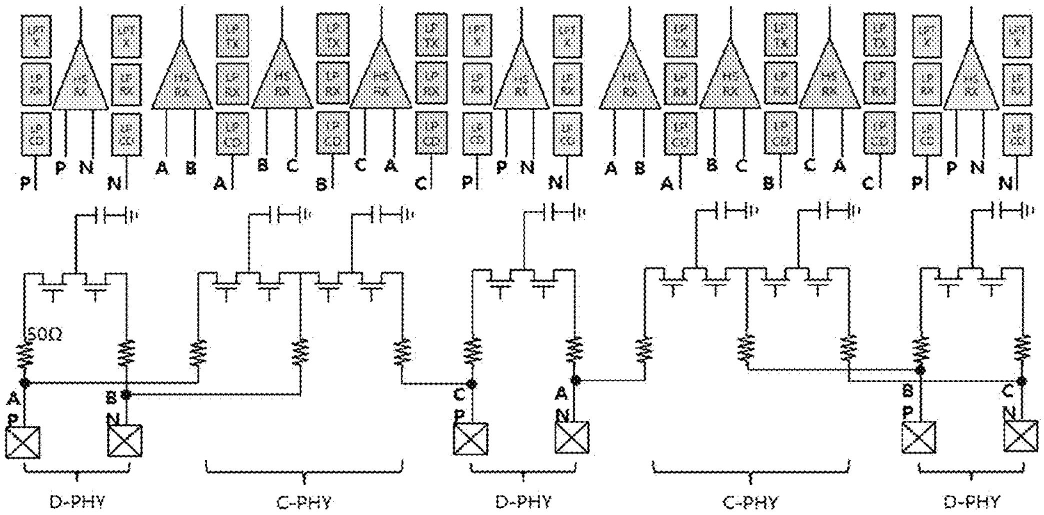
FIG. 3 is a schematic diagram of circuits between resistors of termination and interface components in the MIPI circuit in the related art.

FIG. 3 is a schematic diagram of circuits between Rterms and interface components in the MIPI circuit in the related art.

As illustrated in FIG. 3, in the related art, although the DPHY and the CPHY share pins in the MIPI, each lane of the DPHY corresponds to one Rterm circuit, one comparator (i.e., HSRX in FIG. 3), and two LPRXs, respectively. Each lane of the CPHY corresponds to one Rterm circuit, three comparators, and three LPRXs. As can be seen from FIG. 3, these circuits and devices are independent of each other and are not reused. Therefore, it can be seen that there are a large amount of circuits that need to be constructed in the MIPI in the existing art, and the area required for layout is large and costly. Therefore, there is an urgent need for a scheme that can reduce circuit complexity and improve resource utilization while ensuring the performance of the DPHY and the CPHY in the MIPI.

The disclosure provides a MIPI circuit in response to the above problems. By multiplexing the comparator, the LPRX, and the Rterm and the like in the transmission paths of the CPHY and the DPHY, the circuit complexity and the layout area of the MIPI is reduced, thereby reducing the manufacturing cost.

Figure 4:
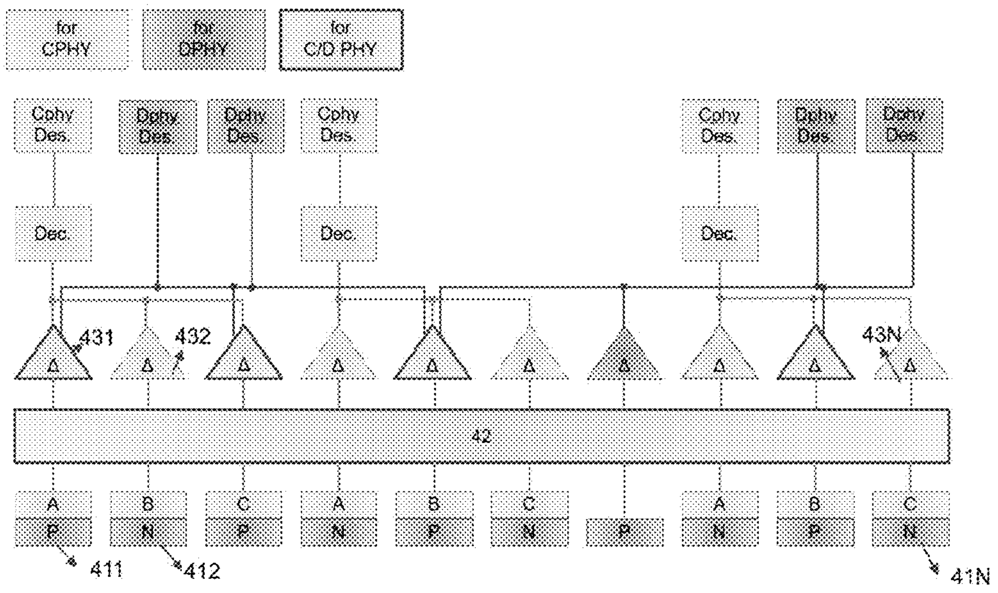
FIG. 4 is a schematic diagram of a MIPI circuit provided by an embodiment of the disclosure.

FIG. 4 is a schematic diagram of a MIPI circuit provided by an embodiment of the disclosure. As illustrated in FIG. 4, the MIPI circuit provided by the disclosure includes:

N pins 41 (labeled from left to right in FIG. 4 as 411, 412, . . . , 41N), a path control component 42, and N interface components 43 (labeled from left to right in FIG. 4 as 431, 432, . . . , 43N).

The path control component 42 is configured to control connection states of the N pins 41 with the N interface components 43 according to an operating mode of the MIPI, the operating mode of the MIPI includes a CPHY interface and a DPHY interface, and the MIPI includes $$\left\lfloor \frac{N}{3} \right\rfloor$$

CPHY lanes, and $$\left\lfloor \frac{N}{2} \right\rfloor - 1$$

DPHY data lanes and one DPHY CLK lane. That is, when the operating mode of the MIPI is determined to be CPHY, some of the N interface components 43 located on the CPHY data path are connected to a corresponding number of pins through the path control component 42, so that data can be transmitted in the CPHY mode, and the circuits between other interface components located on the DPHY data lane and the remaining pins are in the disconnected state. Similarly, when it is determined that the operating mode of the MIPI is DPHY, some of the N interface components 43 located on the DPHY data path are connected to the corresponding number of pins through the path control component 42, so that the data can be transmitted in the DPHY mode, and the circuits between other interface components located on the CPHY data path and the remaining pins are in the disconnected state.

In the disclosure, a plurality of switches may be included in the path control component 42 to cause the circuit between each pin and its corresponding interface component to be connected or disconnected by switching on or off the switch.

As can be seen from FIG. 4, there is a portion of the interface components 43 (represented in FIG. 4 as triangles with bolded edges, e.g., interface component 431) in the MIPI that are shared on both the DPHY and CPHY data paths, and thus regardless of whether the MIPI's operating mode is DPHY or CPHY, these interface components 43 and corresponding pins are in the connected state.

It should be noted that since each CPHY lane has 3 pins, the number of CPHY lanes in the MIPI should be an integer multiple of 3. Therefore, the number of CPHY lanes included in the MIPI can be determined by dividing N by 3 and rounding downward to obtain an integer, which is calculated by the equation:

$$\left\lfloor \frac{N}{3} \right\rfloor.$$

Since the DPHY also includes 1 CLK lane in addition to the data lane, and each lane has 2 pins, the number of DPHY lanes in the MIPI should be an integer multiple of two. The number of DPHY lanes included in the MIPI can be determined by dividing N by 2 and rounding downward to obtain an integer, which is calculated by the equation:

$$\left\lfloor \frac{N}{2} \right\rfloor - 1.$$

For example, when N is 10, $$\left\lfloor \frac{N}{3} \right\rfloor = 3 \text{ and } \left\lfloor \frac{N}{2} \right\rfloor - 1 = 4.$$

There are 3 CPHY lanes, 4 DPHY data lanes and 1 DPHY CLK lane in the MIPI.

It should be noted that the number of pins or interface components is represented by N in FIG. 4, which is illustrative only. In the disclosure, N may be any value determined according to actual needs.

The MIPI circuit provided by the embodiments of the disclosure improves the efficiency and flexibility of data transmission by controlling the data transmission mode in the MIPI through the path control component. Moreover, by multiplexing the interface components in the data paths of the DPHY and the CPHY, the required number of interfaces is reduced, thereby reducing the complexity and cost of the MIPI circuit and expanding the scope of application of the MIPI.

Figure 5:
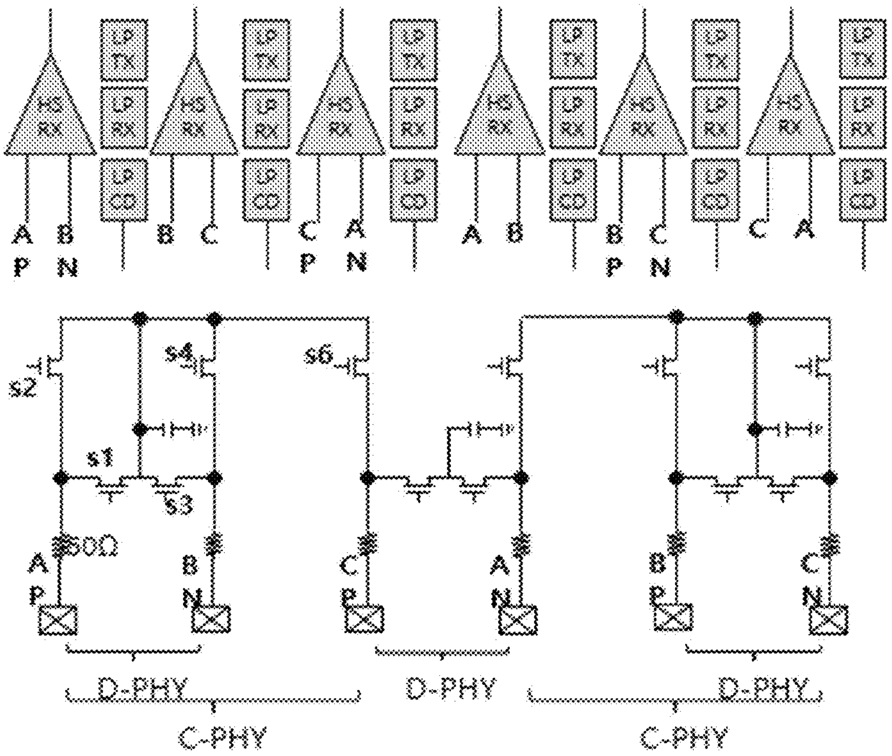
FIG. 5 is a schematic diagram of circuits between resistors of termination and interface components in the MIPI circuit provided by an embodiment of the disclosure.

FIG. 5 is a schematic diagram of circuits between resistors of termination and interface components in the MIPI circuit provided by an embodiment of the disclosure.

As illustrated in FIG. 5, in some possible implementations, the MIPI may also include N Rterms.

One end of each Rterm is connected to a pin, and the other end is connected to the path control component. That is, in the MIPI circuit, on any signal transmission path corresponding to each pin, devices are connected in the order of pin, Rterm, path control component, and interface component.

It is noted that the Rterm can prevent signal reflection from affecting the transmission quality of the entire MIPI system and increase the stability of data transmission, and can be used to match impedance of transmission paths and loads, thereby improving the quality of data transmission. The resistance value of the Rterm can be determined according to the actual need, which can be, for example, 50 for 7502. The resistance values of the Rterms connected to different pins may be the same or different, which is not limited in the disclosure.

In some possible implementations, each interface component may include a HSRX and a low-power transceiver. The low-power transceiver is directly connected to a pin. Two input ends of a HSRX are connected to two Rterms via the path control component, respectively. Each Rterm may be separately connected to input ends of two different HSRXs via the path control component.

It will be appreciated that since the low-power transceiver transmits and receives data with low frequency and amplitude variation, it is able to comply with the requirements for transmitting data in both DPHY and CPHY modes. There is no need to control the connection states in different operating modes through the path control component, and thus the low-power transceiver in the interface component can be directly connected to a pin in the circuit.

In the embodiment of the disclosure, each low-power transceiver may include a LPRX, a LPCD, and a LPTX.

The LPRX is used to receive lower-frequency signals for data transmission in a low-power mode. The LPCD is used to detect a low-power signal voltage on a bi-directional data lane. The LPTX is used to send data signals in a low-power mode. Therefore, the LPTX and LPRX can work together to ensure that data is sent and received correctly. The LPCD can cooperate with the LPTX and LPRX to avoid data conflicts and errors.

Moreover, in order to ensure the signal quality and the flexibility of signal on-off during the high-speed signal transmission process, the two input ends of the HSRX in the interface component are first connected to the path control component separately to control the connection state of the circuit in different operating modes, and then connected to a Rterm through the path control component, respectively, and finally connected to a pin.

Figure 6:
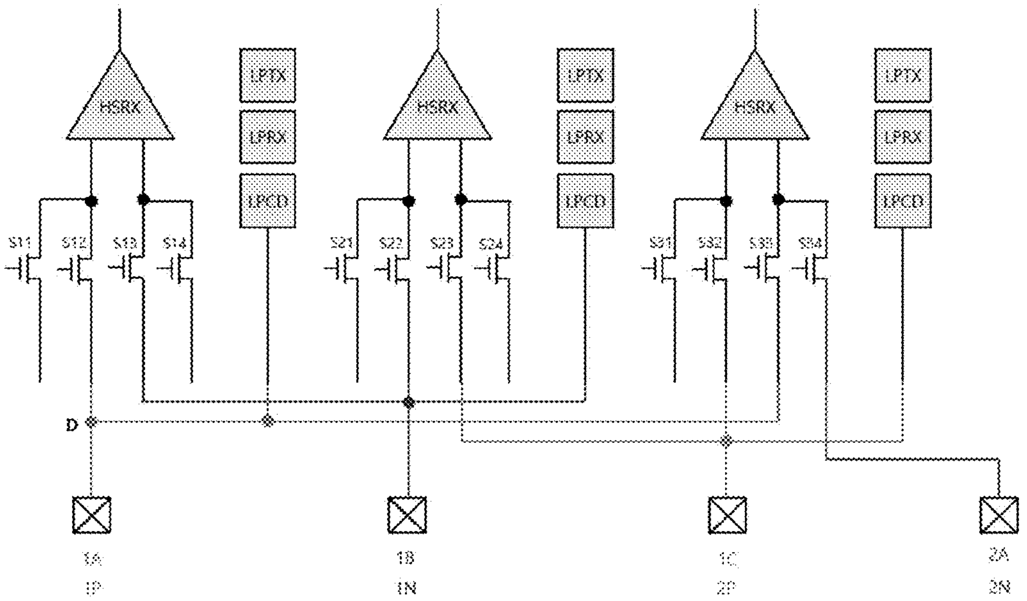
FIG. 6 is a schematic diagram of connections between pins and interface components in the MIPI circuit provided by an embodiment of the disclosure.

It should be noted that the connections of the low-power transceiver and the HSRX in the interface component to the pin or the path control component can be illustrated in combination with FIG. 6. FIG. 6 is a schematic diagram of connections between pins and interface components in the MIPI.

As can be seen from FIG. 6, the low-power transceiver can be directly connected to a pin without the path control component. Both input ends of the HSRX are connected to two pins through the path control component. For example, taking the leftmost HSRX in FIG. 6 as an example, the two input ends of this HSRX are connected to pin 1A1P and pin 1B1N through switches S12 and S13 in the path control component, respectively.

In the embodiment of the disclosure, each Rterm may be connected to the input ends of two different HSRXs via the path control component. As an example, pin 1A1P in FIG. 6 is connected to the input ends of two different HSRXs via connection points (i.e., the points labeled D in FIG. 6) and switches S12 and S33 in the path control component. It should be noted that in the MIPI, each CPHY lane includes 3 interface components, each DPHY data lane includes one interface component, and the DPHY CLK lane includes one interface component.

It is understood that the frequencies of the transmitted signals in the 3 data transmission paths of one CPHY lane may not be fixed, which may be high-frequency signals or low-frequency signals, and thus each path in each CPHY lane should correspond to a interface component respectively, and each CPHY lane may include 3 interface components. On the contrary, the signals transmitted by the different data transmission paths in the DPHY lane are all low-frequency and the paths do not need to each correspond to a interface component, and thus each DPHY data lane includes one interface component, and the DPHY CLK lane includes 1 interface component. As shown in FIG. 5, in some possible implementations, the MIPI also includes N grounding components, and each grounding component may include a first switcher and a second switcher.

It should be noted that the grounding components correspond one-to-one to the HSRXs. Therefore, in the case where the MIPI includes N interface components, i.e., there are N HSRXs, the number of grounding components is also N.

One connection end of the first switcher is connected to one connection end of the second switcher and to the ground, respectively, and the other connection end of the first switcher is connected to the other connection end of the second switcher and to other end of an Rterm, respectively.

Moreover, the first switcher is configured to connect or disconnect the other end of the Rterm to the ground according to a control signal of a control end when the operating mode of the MIPI is a DPHY mode. The second switcher is configured to connect or disconnect the other end of the Rterm to the ground according to a control signal of a control end when the operating mode of the MIPI is a CPHY mode.

It is noted that the control signal may be a digital signal or a control signal sequence issued by a control end such as a digital signal processor or other control logic circuits. By sending the control signal to the switcher, the switcher is controlled to be on or off to disconnect or connect the connection between the Rterm and the ground.

For example, the first switcher may be the switches on the horizontal circuits of FIG. 5, i.e., the switchers labeled s1 and s3. The second switcher may be the switches on the vertical circuits of FIG. 5, i.e., the switchers labeled s2 and s4, s1 and s2 may serve as one grounding component, and s3 and s4 may also serve as one grounding component.

It should be noted that only the first switcher and the second switcher in some of the grounding components are exemplarily labeled in FIG. 5, and the switchers in the other grounding components are located similarly and are thus omitted in FIG. 5.

As can be seen from FIG. 5, each CPHY lane is associated with 3 grounding components, and one connection ends of 3 second switchers in the 3 grounding components are connected to each other. Each DPHY lane is associated with 2 grounding components, and one connection ends of 2 first switchers in the 2 grounding components are connected to each other.

In some possible embodiments, the MIPI may also include a capacitor for stabilizing the circuit voltage. The capacitor is represented by two vertical lines that are parallel and of equal length in the circuit shown in FIG. 5. One end of the capacitor is connected to the first switcher and the second switcher, and the other end is connected to ground.

It is understood that when comparing the circuit structure of the MIPI proposed in FIG. 5 of the disclosure with the circuit structure of the MIPI in the related art as shown in FIG. 3, if the number of pins is the same, i.e., the number of lanes of the CPHY and DPHY is the same, the circuit structure of FIG. 5 is significantly less complex than that of FIG. 3, which reduces the area covered by circuits and the number of used interface components, thereby greatly reducing the production cost of MIPI.

It is noted that FIG. 5 serves only as a schematic illustration, and the number of pins, the number of lanes, and the specific circuit drawing methods may be determined according to the actual needs, which is not limited herein. It is also known that as the number of pins and the number of lanes increase, the beneficial effects of the circuit structure of the MIPI proposed in the disclosure in terms of cost saving, reduction of area required for layout, and the like, are also improving.

The following contents are described in combination with FIG. 6 to illustrate how to realize the connections between pins and interface components through the path control component.

It should be noted that only the connections between 4 pins and corresponding interface components are illustrated in FIG. 6 as examples. If there are more than 4 pins, the connections are constructed in a similar manner as the connections in FIG. 6.

In some possible implementations, the path control component includes N control units, each of the control units includes: a third switcher and a fourth switcher.

It should be noted that the control units are in the external circuits of the interface components and are connected to the input ends of the HSRXs in the interface components. Each control unit corresponds to one HSRX, and different HSRXs correspond to different control units. Therefore, if the MIPI includes N interface components, i.e., there are N HSRXs, there are N control units.

One connection end of the third switcher is connected to a pin, and the other connection end of the third switcher is connected to one connection end of an interface component.

One connection end of the fourth switcher is connected to a different pin, and the other connection end of the fourth switcher is connected to the other connection end of the interface component to which the third switcher device is connected.

In addition, the third switcher and the fourth switcher are used to connect or disconnect the interface component with the pin according to a control signal of a control end. It should be noted that the connection end of the interface component refers to an input end of the HSRX and a low-power transceiver.

In the embodiment of the disclosure, the connection between the interface component and the pin is connected when the third switcher and the fourth switcher close the switch in accordance with the received control signal, and data received at the pin can be transmitted to the interface component through the path where the third switcher or the fourth switcher is located.

Alternatively, the connection between the interface component and the pin is disconnected when the third switcher and the fourth switcher disconnect the switch in accordance with the received control signal, to prevent data received at the pin from being transmitted to the interface component through the path on which the third switcher or the fourth switcher is located. For example, taking the leftmost HSRX in FIG. 6 as an example, the HSRX corresponds to one control unit, and it includes a third switcher (i.e., the switcher labeled S12 in FIG. 6) and a fourth switcher (i.e., the switcher labeled S13 in FIG. 6).

It should be noted that in order to facilitate switching the operating mode of the MIPI, more path choices are provided to improve the flexibility of the MIPI operation. Therefore, it is possible to add switchers (e.g., S11 and S14 shown in FIG. 6) in addition to the two original switchers corresponding to the two input ends of the HSRX, and the number of data input paths is increasing. The number of switchers in each control unit may be greater than 2, for example, 4.

In some possible implementations, the $i^{th}$ control unit further includes a fifth switcher, i=3m, m being a positive integer.

One connection end of the fifth switcher is connected to one connection end of the $i^{th}$ interface component, and the other connection end of the fifth switcher is connected to the (i+1)th pin. The other connection end of the $i^{th}$ interface component is connected to the $i^{th}$ pin through a switcher in the $i^{th}$ control unit.

As illustrated in FIG. 6, when m is 1, i=3m. Since the ends of the switchers S32 and S33 in the third leftmost control unit in FIG. 6 are connected to the third pin 1C2P and the first pin 1A1P, respectively, and each of the switchers can control data transmission of only one pin. Therefore, in the DPHY mode, when the third interface component needs to connect two pins labeled P and N respectively at the same time, the pin labeled 2P is connected to the interface component through S32, while the pin labeled 2N cannot be connected to the interface component through S33, and thus it is necessary to control the connection with an additional switcher. Therefore, the third control unit may include the fifth switcher S34, and one connection end of S34 is connected to a connection end of the third interface component, and the other connection end is connected to the fourth pin 2A2N. The other connection end of the third interface component may be connected to the third pin via S32 in the third control unit.

It will be appreciated that since there are four pins in the MIPI shown in FIG. 6, two DPHY data lanes or one CPHY data lane can be identified in FIG. 6. When the MIPI is in the CPHY mode, S12, S13, S22, S23, S32, and S33 are closed, and the connection between 3 HSRXs and the pins labeled 1A, 1B, and 1C in FIG. 6 is connected. When the MIPI is in a DPHY mode, S12 and S13 are closed, the connection between the leftmost HSRX and the pins labeled 1P and 1N in FIG. 6 is connected, and S32 and S34 are closed, and the connection between the rightmost HSRX and the pins labeled 2P and 2N in FIG. 6 is connected.

It should be noted that the switchers (e.g., S11, S14, etc.) that are not connected to any pin in FIG. 6 are intended to illustrate the consistency of the structure among the various control units, and these switchers are not used in specific solutions of the disclosure.

The process of coordinating the grounding component and the path control component in different MIPI operating modes is further described below in combination with FIGS. 5 and 6.

As an example, if the MIPI is operated in the DPHY mode, at this time, the first switchers s1 and s3 in FIG. 5 are in an operating state, and the second switchers s2, s4 and s6 are in an non-operating state. When S12 and S13 in the path control component shown in FIG. 6 are closed, the path between HSRX and pins 1P and 1N via the Rterm is connected, and at this time, the first switchers s1 and s3 are in the off state.

When S12 and S13 in the path control component shown in FIG. 6 are turned off, the remaining charge in the pin and in the conductor can be drained by closing s1 and s3 in FIG. 5 to connect the HSRX to the ground, to prepare for the next cycle of signal transmission and prevent signal interference.

If the MIPI operates in the CPHY mode, when S12, S13, S22, S23, S32, and S33 in the path control component shown in FIG. 6 are all closed, the paths between the three HSRXs and pins 1A, 1B, and 1C are each connected. At this time, the second switchers s2, s4, and s6 in the grounding component of FIG. 5 are in the off state to avoid connecting the three HSRXs to the ground.

When S12, S13, S22, S23, S32, and S33 in the path control component shown in FIG. 6 are all turned off, the second switchers s2, s4, and s6 in the grounding component of FIG. 5 can all be closed to drain the remaining charge in the pin and in the conductor to prepare for the next cycle of signal transmission and to prevent signal interference.

Figure 7:
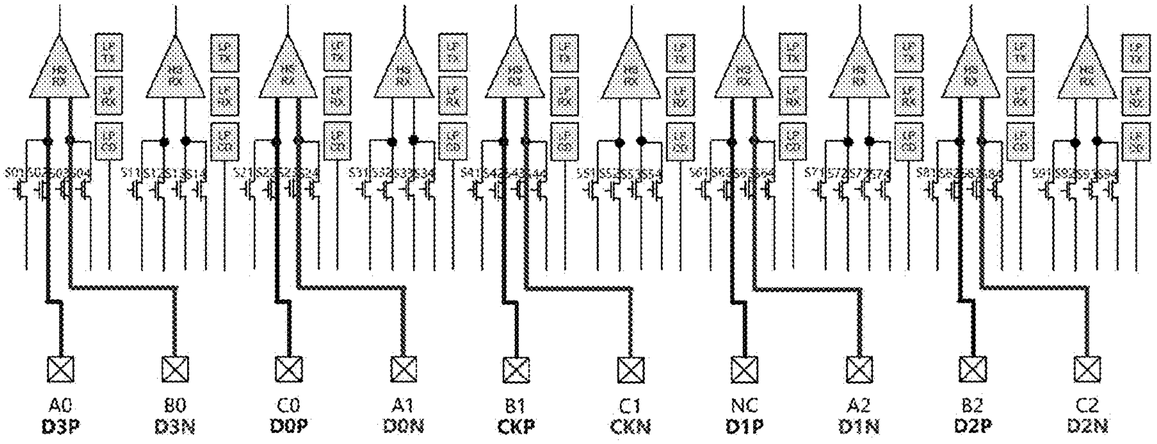
FIG. 7 is a schematic diagram of data transmission in the MIPI in a DPHY mode provided by an embodiment of the disclosure.

The on or off state of each switcher in the path control component when data transmission is performed in different operating modes in the MIPI is further described below in combination with FIGS. 7 and 8. FIG. 7 is a schematic diagram of data transmission in the MIPI in a DPHY mode provided by an embodiment of the disclosure.

As shown in FIG. 7, each HSRX can be connected to the four switchers Sn1, Sn2, Sn3, and Sn4 in the path control component respectively, and the other end of each switcher can be connected to a pin. Since the MIPI includes 10 pins, it can be determined that the MIPI includes 3 CPHY lanes, 4 DPHY data lanes and 1 DPHY CLK lane. Since the 3 CPHY lanes occupy only 9 pins, it is possible to use NC to identify a pin that cannot operate in the CPHY mode, the 10 pins can be labeled from left to right as A0, B0, C0, A1, B1, C1, NC, A2, B2, C2 or D3P, D3N, D0P, D0N, CKP, CKN, D1P, D1N, D2P, D2N.

In FIG. 7, each of two pins can determine a data lane, such as D3P and D3N, D0P and D0N, etc., as well as two pins, CKP and CKN, which can determine a CLK lane. Each data lane and CLK lane can be connected to an interface component (i.e., HSRX in the figure) by closing the corresponding switcher. As shown in FIG. 7, the switchers S02, S03, S22, S23, S42, S43, S62, S63, S82, and S83 are in the connected state, and the MIPI performs data transmission in the DPHY mode.

Figure 8:
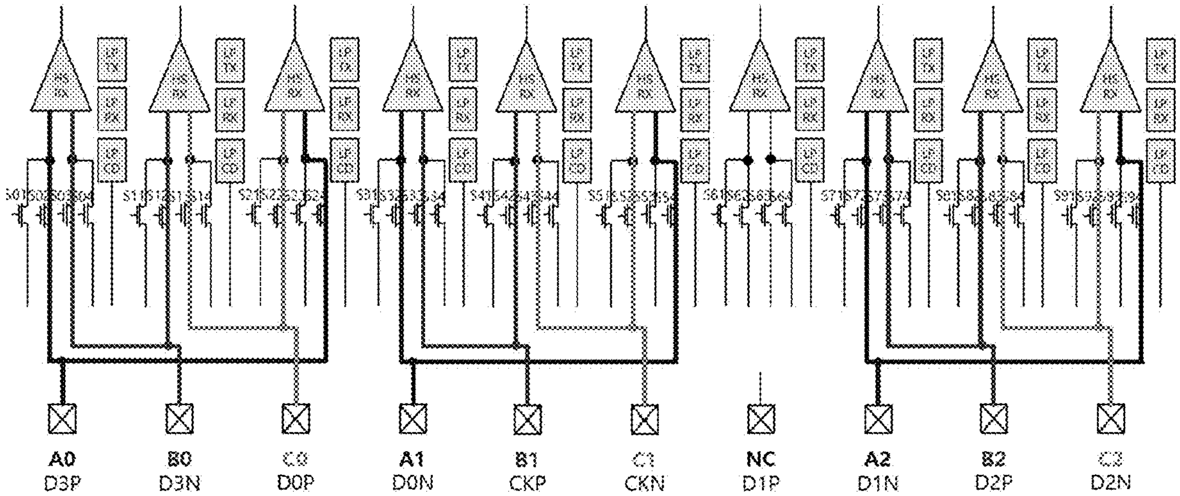
FIG. 8 is a schematic diagram of data transmission in the MIPI in a CPHY mode provided by an embodiment of the disclosure.

FIG. 8 is a schematic diagram of data transmission in the MIPI in a CPHY mode provided by an embodiment of the disclosure.

In FIG. 8, each of three pins, i.e., A0, B0 and C0, A1, B1 and C1, or A2, B2 and C2, can determine a data lane. Each data lane can be connected to 3 interface components (i.e., HSRX in the figure) by closing the corresponding switchers. As shown in FIG. 8, the switchers S02, S03, S12, S13, S22, and S24 are connected, and data can be transmitted via pins A0, B0, and C0. The switchers S32, S33, S42, S43, S52, and S54 are connected, and data can be transmitted via pins A1, B1, and C1. The switchers S72, S73, S82, S83, S92, S94 are connected, and data can be transmitted via pins A2, B2, and C2, and thus it can be determined that the MIPI is operated in the CPHY mode.

Based on the MIPI circuit provided in the above embodiments, the embodiments of the disclosure also provide a chip including the MIPI circuit provided in the above embodiments.

Based on the MIPI circuit provided in the above embodiments, the embodiments of the disclosure also provide an electronic device including the chip described in the above embodiments and a display.

The MIPI circuit of the embodiments of the disclosure controls the mode of data transmission mode in the MIPI through the path control component, which improves the efficiency and flexibility of data transmission. Moreover, by multiplexing the interface components in the data lanes of the CPHY and the DPHY, the required number of interfaces is reduced, thereby reducing the complexity and cost of the MIPI circuit and expanding the scope of application of the MIPI.

In the description of this specification, the terms "first" and "second" are used for descriptive purposes only and are not to be understood as indicating or implying relative importance or implicitly specifying the number of technical features indicated. Thus, a feature defined with the terms "first" and "second" may expressly or impliedly include at least one such feature. In the description of the disclosure, the term "plurality" means at least two, e.g., two, three, etc., unless specified otherwise.

Although embodiments of the disclosure have been shown and described above, it is understood that the above embodiments are exemplary and are not to be construed as limiting the disclosure, and those skilled in the art may make changes, modifications, substitutions, and variations to the above embodiments within the scope of the disclosure.

What is claimed is:

1. A Mobile Industry Processor Interface (MIPI) circuit, comprising: N pins, a path control component and N interface components, wherein N is a positive integer;

wherein the path control component is configured to control connection states of the N pins with the N interface components according to an operating mode of the MIPI circuit, the operating mode of the MIPI circuit comprises a camera physical layer (CPHY) mode and a display physical layer (DPHY) mode, and the MIPI circuit comprises $$\left\lfloor \frac{N}{3} \right\rfloor$$

CPHY lanes, and $$\left\lfloor \frac{N}{2} \right\rfloor - 1$$

DPHY data lanes and 1 DPHY clock (CLK) lane, wherein N is a positive integer; and wherein the MIPI circuit further comprises N resistors of termination, each of the N interface components comprises a high-speed receive (HSRX) and a low-power transceiver, one end of each of the N resistors of termination is connected to a pin, and the other end of each of the N resistors of termination is connected to input ends of two different HSRXs through the path control component respectively, each low-power transceiver is connected to a pin, two input ends of one HSRX are connected to two resistors of termination through the path control component respectively, such that a portion of the N pins and a portion of the N interface components are shared on both the DPHY data lanes and the CPHY lanes.

2. The MIPI circuit of claim 1, wherein each of the CPHY lanes comprises 3 interface components, each of the DPHY data lanes comprises 1 interface component, and the DPHY CLK lane comprises 1 interface component.

3. The MIPI circuit of claim 1, wherein each low-power transceiver comprises: a Low-Power Receive (LPRX), a Low Power Contention Detector (LPCD), and a Low-Power Transmit (LPTX);

wherein the LPRX is configured to receive lower-frequency signals for data transmission in a low-power mode, the LPCD is configured to detect a low-power signal voltage on a bi-directional data lane, the LPTX is configured to send data signals in a low-power mode.

4. The MIPI circuit of claim 1, further comprising: N grounding components, wherein each of the grounding components comprises a first switcher and a second switcher;

one connection end of the first switcher is connected to one connection end of the second switcher and to the ground, respectively;

the other connection end of the first switcher is connected to the other connection end of the second switcher and the other end of a resistor of termination, respectively;

the first switcher is configured to connect or disconnect the other end of the resistor of termination with the ground according to a control signal of a control end when the operating mode of the MIPI circuit is the DPHY mode; and the second switcher is configured to connect or disconnect the other end of the resistor of termination with the ground according to the control signal of the control end when the operating mode of the MIPI circuit is the CPHY mode.

5. The MIPI circuit of claim 4, wherein each of the CPHY lanes is associated with 3 grounding components, 3 connection ends respectively of 3 second switchers in the 3 grounding components are connected to each other; and each of the DPHY lanes is associated with 2 grounding components, 2 connection ends respectively of 2 first switchers in the 2 grounding components are connected to each other.

6. The MIPI circuit of claim 4, further comprising: a capacitor, one end of the capacitor is connected to the first switcher and the second switcher, and the other end of the capacitor is connected to ground.

7. The MIPI circuit of claim 1, wherein the path control component comprises N control units, each of the control units comprises: a third switcher and a fourth switcher;
- one connection end of the third switcher is connected to one of the pins;
- the other connection end of the third switcher is connected to one connection end of one interface component;
- one connection end of the fourth switcher is connected to another one of the pins;
- the other connection end of the fourth switcher is connected to the other connection end of the one interface component; and
- the third switcher and the fourth switcher are configured to connect or disconnect the one interface component with the pins according to a control signal of a control end.

8. The MIPI circuit of claim 7, each of the control units further comprises two or more additional switchers; wherein the one connection end of the one interface component is further connected to one connection end of the one of the additional switchers, wherein the other one connection end of the one interface component is further connected to one connection end of the other of the additional switcher.

9. The MIPI circuit of claim 7, wherein the $i^{th}$ control unit further comprises a fifth switcher, where i=3m, m being a positive integer;
- one connection end of the fifth switcher is connected to one connection end of the $i^{th}$ interface component, and the other connection end of the fifth switcher is connected to the $(i+1)^{th}$ pin, wherein the other connection end of the $i^{th}$ interface component is connected to the $i^{th}$ pin through one switcher in the $i^{th}$ control unit.

10. A chip, wherein the chip comprises:
- a Mobile Industry Processor Interface (MIPI) circuit, the MIPI circuit comprising:
  - N pins, a path control component and N interface components, wherein N is a positive integer;
  - wherein the path control component is configured to control connection states of the N pins with the N interface components according to an operating mode of the MIPI circuit, the operating mode of the MIPI circuit comprises a camera physical layer (CPHY) mode and a display physical layer (DPHY) mode, and the MIPI circuit comprises $$\left\lfloor \frac{N}{3} \right\rfloor$$

CPHY lanes, and $$\left\lfloor \frac{N}{2} \right\rfloor - 1$$

DPHY data lanes and 1 DPHY clock (CLK) comprises lane, wherein N is a positive integer; and
  - wherein the MIPI circuit further comprises N resistors of termination, each of the interface components comprises a high-speed receive (HSRX) and a low-power transceiver, one end of each of the N resistors of termination is connected to a pin, and the other end of each of the N resistors of termination is connected to input ends of two different HSRXs through the path control component respectively, each low-power transceiver is connected to a pin, two input ends of one HSRX are connected to two resistors of termination through the path control component respectively, such that a portion of the N pins and a portion of the N interface components are shared on both the DPHY data lanes and the CPHY lanes.

11. The chip of claim 10, wherein each of the CPHY lanes comprises 3 interface components, each of the DPHY data lanes comprises 1 interface component, and the DPHY CLK lane comprises 1 interface component.

12. The chip of claim 8, further comprising: N grounding components, wherein each of the grounding components comprises a first switcher and a second switcher;
- one connection end of the first switcher is connected to one connection end of the second switcher and to the ground, respectively;
- the other connection end of the first switcher is connected to the other connection end of the second switcher and the other end of a resistor of termination, respectively;
- the first switcher is configured to connect or disconnect the other end of the resistor of termination with the ground according to a control signal of a control end when the operating mode of the MIPI circuit is the DPHY mode; and
- the second switcher is configured to connect or disconnect the other end of the resistor of termination with the ground according to the control signal of the control end when the operating mode of the MIPI circuit is the CPHY mode.

13. The chip of claim 12, wherein each of the CPHY lanes is associated with 3 grounding components, 3 connection ends respectively of 3 second switchers in the 3 grounding components are connected to each other; and
- each of the DPHY lanes is associated with 2 grounding components, 2 connection ends respectively of 2 first switchers in the 2 grounding components are connected to each other.

14. The chip of claim 10, wherein the path control component comprises N control units, each of the control units comprises: a third switcher and a fourth switcher;
- one connection end of the third switcher is connected to one of the pins;
- the other connection end of the third switcher is connected to one connection end of one interface component;
- one connection end of the fourth switcher is connected to another one of the pins;
- the other connection end of the fourth switcher is connected to the other connection end of the one interface component; and the third switcher and the fourth switcher are configured to connect or disconnect the one interface component with the pins according to a control signal of a control end.

15. The chip of claim 14, wherein the $i^{th}$ control unit further comprises a fifth switcher, where i=3m, m being a positive integer;
- one connection end of the fifth switcher is connected to one connection end of the $i^{th}$ interface component, and the other connection end of the fifth switcher is connected to the $(i+1)^{th}$ pin, wherein the other connection end of the $i^{th}$ interface component is connected to the $i^{th}$ pin through one switcher in the $i^{th}$ control unit.

16. An electronic device, wherein the electronic device comprises the chip and a display, wherein the chip comprises a Mobile Industry Processor Interface (MIPI) circuit, the MIPI circuit comprising:

N pins, a path control component and N interface components, wherein N is a positive integer, wherein the path control component is configured to control connection states of the N pins with the N interface components according to an operating mode of the MIPI circuit, the operating mode of the MIPI circuit comprises a camera physical layer (CPHY) mode and a display physical layer (DPHY) mode, and the MIPI circuit comprises $$\left\lfloor \frac{N}{3} \right\rfloor$$

CPHY lanes, and $$\left\lfloor \frac{N}{2} \right\rfloor - 1$$

DPHY data lanes and 1 DPHY clock (CLK) lane, wherein N is a positive integer, and wherein the MIPI circuit further comprises N resistors of termination, each of the interface components comprises a high-speed receive (HSRX) and a low-power transceiver, one end of each of the N resistors of termination is connected to a pin, and the other end of each of the N resistors of termination is connected to input ends of two different HSRXs through the path control component respectively, each low-power transceiver is connected to a pin, two input ends of one HSRX are connected to two resistors of termination through the path control component respectively, such that a portion of the N pins and a portion of the N interface components are shared on both the DPHY data lanes and the CPHY lanes.

* * * * *